March 24, 1936. S. PRZYBOROWSKI 2,035,403
HEAT EXCHANGE DEVICE
Filed Nov. 17, 1933
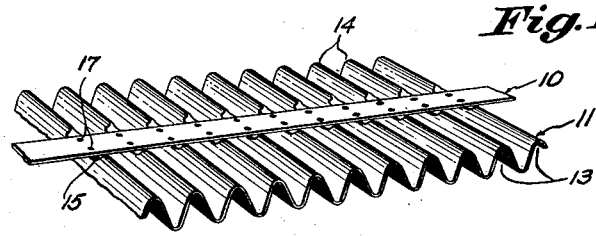
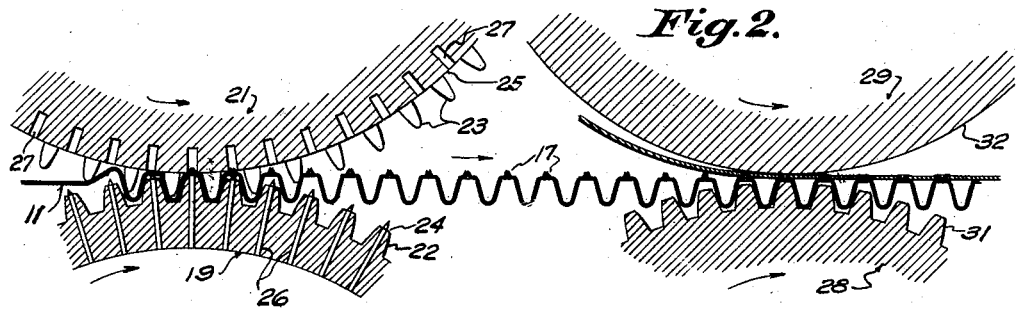
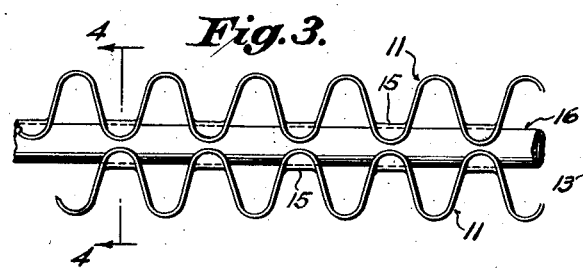
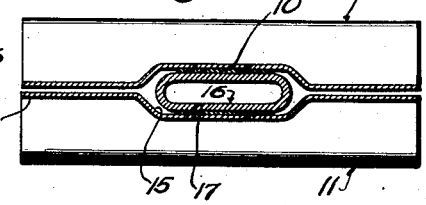
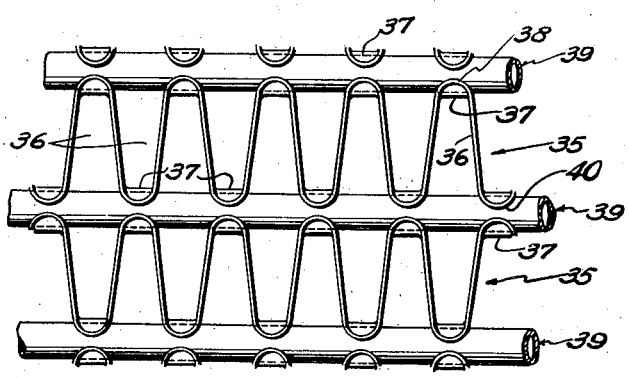
Inventor
Stanislaus Przyborowski
By
Albert R. Henry
Attorney Patented Mar. 24, 1936

2,035,403

UNITED STATES PATENT OFFICE 2,035,403

HEAT EXCHANGE DEVICE

Stanislaus Przyborowski, Buffalo, N. Y., assignor to Fedders Manufacturing Company, Inc., Buffalo, N. Y.

Application November 17, 1933, Serial No. 698,408

5 Claims. (Cl. 257—263)

This invention relates to heat exchange devices such as radiators or condensers, and it has special reference to an improved fin structure.

The invention resides in a fin unit consisting of an elongated fin and a solder ribbon insert, and to a novel method of securing the fin and ribbon without the application of heat. The product thus obtained provides a fin structure which may be shipped or handled as a unit prior to its assembly with a radiator or condenser.

The advantages derived from the use of this unit type of structure chiefly lie in the economies effected during its assembly with a tube, wherein the usual laborious hand soldering operation is obviated by the simple application of heat to the assembled fin unit and tube. A considerable quantity of solder is also saved and the joints thus formed are characterized by their mechanical uniformity and absence of excess solder.

The structure whereby these economies are effected is more specifically set forth in several exemplary embodiments, as described and shown in the accompanying specification and drawing, wherein:

Fig. 1 is a perspective view of a portion of a fin with a solder ribbon secured thereto;

Fig. 2 is a diagrammatic cross-section through a fin forming mechanism, showing the fin during the process of formation and the mechanical application of a solder ribbon thereto;

Fig. 3 is a side elevation of an assembled tube and fin units;

Fig. 4 is a section on the line 4—4 of Fig. 3;

Fig. 5 is a side elevation of a fin and tube assembly forming a second embodiment of the invention.

The invention concerns the organization of a solder ribbon 10 with a fin 11 of the continuous type. The fin may be formed in any manner depending upon the ultimate disposal of the tube or tubes with which it is to be integrated, or on thermal considerations. For condenser or heating devices, the fin 11 of Fig. 1 may be used, and it may be formed with a plurality of regularly spaced corrugations 13, the crests 14 of which are each formed with a central depression or saddle portion 15 to serve as a receiving socket for a flattened tube 16, to which it is subsequently secured.

The fin is formed in an apparatus hereinafter described, and it is provided therein with integral upstanding tangs 17 of relatively small size, which are pierced through the solder ribbon 10 and subsequently flattened to provide a secure connection. This provides an assembly where the ribbon is disposed lineally across the corrugations 13 of the fin and secured to each saddle portion 15 by the tangs 17, which in effect rivet the ribbon to the fin.

The precise method of producing the described unit may be varied in numerous manners, but the continuous or roller forming method is to be preferred. In this method, flat copper ribbon is first formed with corrugations and saddle portions and is subsequently united with a solder ribbon in the same apparatus. Referring to Fig. 2, copper ribbon is fed between rolls 19 and 21 which are formed with meshing die teeth 22 and 23, respectively, which form the corrugations 13. The central portions of the teeth 22 are relieved or flattened as indicated by the numeral 24, while the corresponding portions of the teeth 23 are provided with a protruding circular insert 25 which cooperates with the portion 24 to form the saddles 15.

A pair of piercing punches 26 of needle-like proportions are mounted in the flattened portions of each tooth 22, while the insert 25 is formed with die holes 27, which together cooperate to form the sharp projections or tangs 17.

The formed fin is then directed to a succeeding set of rolls 28 and 29, the lower roll 28 of which is formed with teeth 31 for receiving the medial portions of the formed fin and the upper roll 29 is formed with a circular uninterrupted periphery 32 adapted to clamp the surface of the saddles 15 to the teeth 31 in transit.

A spool of solder ribbon is suitably disposed between the two sets of rolls, and the ribbon therefrom is guided (not shown) into the rolls 28 and 29 in position on the saddles 15. During this operation, the clamping action of these rolls first forces the tangs 17 through the solder ribbon and then flattens or crushes the tangs into a rivet-like connection on the ribbon.

After the described operations, the continuous fin and solder unit may be cut into suitable lengths and packed for shipping or immediately assembled with tubes. In either event, the fin units will be found to be capable of receiving rough handling without fear of detachment of the solder ribbon, since the riveted connection provides a relatively secure attachment to the fin.

Several practical applications of the fin unit to tubes are shown herein. For example, in Figs. 3 and 4, the fin units of Fig. 1 are disposed on opposite sides of the flattened tube 16 with the saddles 15 engaging over the tube to effect the contact of the solder ribbon portions of the unit therewith (Fig. 3). The fin units and tube are clamped in this position and subjected to an application of heat to fuse the solder ribbon 10, whereupon a positive connection is obtained between the saddles 15 and the tube 16. It will be apparent from the foregoing that the shape and disposal of the saddles 15 are largely dependent upon the cross-sectional configuration of the tube, and therefore it is anticipated that various modifications may be made therein, even to the substantial exclusion of the depressions, without departing from the spirit of the invention.

In Fig. 5 a fin 35, more suitable to radiator structures, is disclosed, and it may be formed in a similar manner to the fin of Fig. 1, with the exceptions that the corrugations 36 thereof are considerably deeper and that saddles 37 are formed both on the crests 38 and on the exterior of the troughs 40 of the corrugations. Solder ribbon 10 is secured across the saddles 37 in a similar manner, and it permits the interposition of the fin unit between parallel tubes 39 with the opposed saddles in engagement with adjacent tubes. A subsequent heating operation effects the soldering of the tubes and fins and the resulting structure provides a plurality of parallel tubes spaced from each other and thermally connected by the fins 35. Structurally, the fins will be found to reinforce the assembly adequately, since their disposal affords both compression and diagonal reinforcement against the stresses to which radiators are usually subjected.

Another important consideration in the forming of radiators of the general type shown in Fig. 5, is the elimination of all unnecessary solder so that the brass or copper surfaces are unimpaired, as, obviously, solder is a less efficient heat transfer agent than copper, and furthermore is a relatively expensive metal. In the present device, the foil-like solder ribbon is almost inconsequential in volume, as compared to the amount of solder used in other processes, and the waste portions exterior of the joints drop away from the assembly during the heating operation, and as a result the copper surfaces remain uncoated.

It is not intended to claim that the general fin-solder ribbon type of unit is new to this application, since it has been shown in application Serial No. 600,901, filed March 24, 1932, which has since matured into Patent No. 1,970,105, dated August 14, 1934, but rather, it is intended that this invention be considered an improvement in said application, as typified in the accompanying claims.

I claim:

1. A fin unit comprising an elongated metallic fin formed with a plurality of transverse corrugations, a solder ribbon arranged lineally along said fin and in engagement with the crests of the corrugations and bridging the troughs thereof, and means securing the solder ribbon to the corrugation crests.

2. A fin unit comprising an elongated metallic fin formed with a plurality of transverse corrugations, each corrugation having a central depressed portion formed in its crest, a solder ribbon arranged lineally in the depressed portion of the corrugations and in engagement therewith, and means securing the solder ribbon to the depressed portions.

3. A fin unit comprising an elongated metallic fin formed with a plurality of transverse corrugations, a solder ribbon arranged on the medial line of the fin, and tangs struck out of the fin and secured to the solder ribbon.

4. A fin unit comprising an elongated metallic fin formed with a plurality of transverse corrugations, each corrugation having a central depressed portion formed in its crest, a solder ribbon arranged on the longitudinal axis of the fin and disposed in the depressed portions thereof, and tangs struck out of said depressed portions and piercing the ribbon, said tangs being subsequently flattened to secure the ribbon to the fin.

5. A fin unit comprising an elongated metallic fin formed with a plurality of transverse corrugations determined by crests and troughs, said corrugations being formed with depressed portions on opposite sides and on the crests and troughs thereof, respectively, a solder ribbon on each side of the fin and disposed across the respective depressed portions thereof, and means securing the ribbons to said depressed portions.

STANISLAUS PRZYBOROWSKI.